United States Patent [19]

Marsh et al.

[11] 4,326,291
[45] Apr. 20, 1982

[54] ERROR DETECTION SYSTEM

[75] Inventors: Phillip W. Marsh, Granger; Gregory B. Wiedenman, Sandy, both of Utah

[73] Assignee: Sperry Rand Corporation, New York, N.Y.

[21] Appl. No.: 29,074

[22] Filed: Apr. 11, 1979

[51] Int. Cl.³ .................. G06F 11/10; G06F 11/16
[52] U.S. Cl. .................................... 371/68; 364/741; 371/49
[58] Field of Search ........... 340/146.1 AG, 146.1 BA, 340/146.1 BE; 235/306, 307; 364/741; 371/49, 68

[56] References Cited

U.S. PATENT DOCUMENTS 3,303,482  2/1967  Jenkins ............... 340/146.1 AG X
3,476,922  11/1969 Yiotis .................. 235/307
3,531,631  9/1970  Burgess ............... 340/146.1 AG X
3,599,146  8/1971  Weisbecker .......... 340/146.1 AG Primary Examiner—Jerry Smith
Attorney, Agent, or Firm—Thorpe, North, Western & Gold

[57] ABSTRACT

In a throughput error detection system, a redundant logic unit is provided along with a required logic unit for simultaneous operation therewith. The required logic unit and redundant logic unit both produce output data which, it is desired, will be the same. The output data from the required logic unit is supplied to a data bus and the output data of the redundant logic unit is supplied to a parity check digit generator. From the data received from the redundant logic unit, the parity check digit generator generates a parity check digit which is applied to the data bus along wih the data from the required logic unit. A parity checking circuit receives the data and the parity check digit from the data bus and a calculation is made by the circuit to determine if parity is correct. If parity is not correct, the checking circuit produces an alarm signal to alert a user.

8 Claims, 1 Drawing Figure

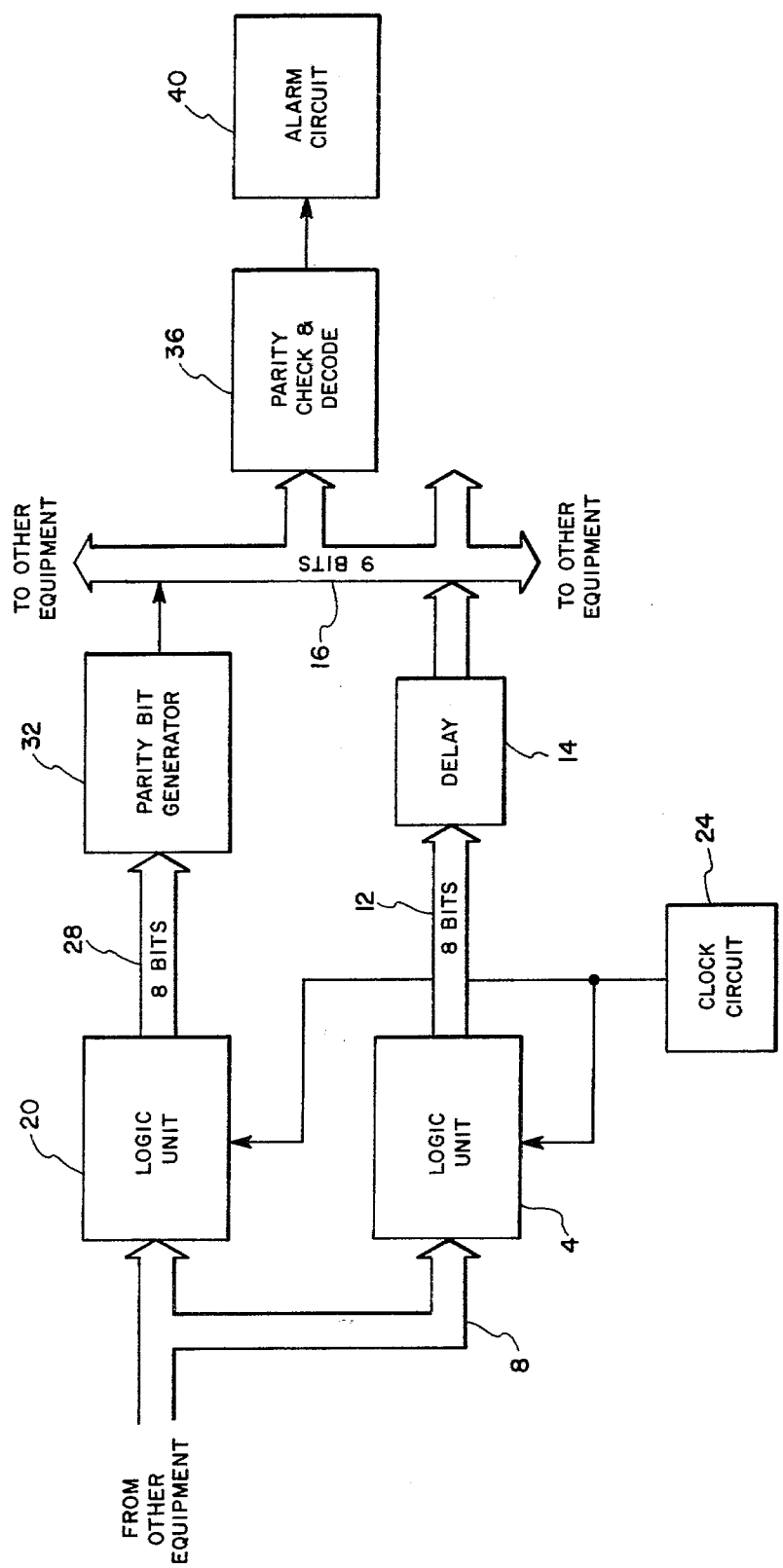

ERROR DETECTION SYSTEM

BACKGROUND OF THE INVENTION

The present invention relates to an error detection system for detecting errors which may occur in the processing of data by a logic unit.

The need for the accurate processing of digital data is well known in computer and automation technology. Most often, such digital data is represented or coded into sequences of binary signals (hereinafter referred to as bits). Each position in such sequential code word consists of a bit "0" or "1", the different code word permutations of bits representing different items of information.

It is desirable in the processing of digital data to be able to detect when an error has occurred in the processing operation so that corrective action may be taken. One well known technique for determining when an error has occurred is to provide redundant data for comparing with the actual data, or redundant processing units whose output is compared with the actually used processing unit. When the comparison produces a discrepancy or a mismatch, then it is known that an error has occurred and the user of the system can be notified.

The above described arrangements can be quite costly because of the cost of equipment necessary for comparing real data bits with the redundant data bits, especially if it is desired to have such comparison performed in more than one location in the system. Then, not only must additional comparing units be provided, but data buses for carrying the redundant bits must also be provided.

SUMMARY OF THE INVENTION

It is an object of the present invention to provide an improved and inexpensive system for detecting the occurrence of errors in the processing of data by a logic unit.

It is another object of the present invention to provide such a system wherein very little additional circuitry is necessary for enabling detection of errors.

The above and other objects of the invention are realized in a specific illustrative embodiment which includes first and second logic units for receiving data and for processing the data to produce resultant output data. The output data from one of the logic units is applied to a data bus whereas the output data from the other logic unit is applied to a parity check digit generator which generates one or more parity check digits from the received data. The parity check digits are then applied to the data bus along with the output data from the first logic unit. The data and the parity check digits may then be utilized by other equipment of the system or simply stored. A parity checking circuit is also included for receiving the data and parity check digits either from the bus or other equipment and for checking parity to determine if it is correct. If parity is incorrect, the checking circuit produces an alarm to notify the user that an error has occurred in either the processing of the data or transmission of the data to the checking circuit. In either case the user may then take whatever action is appropriate to eliminate the effects of the error.

BRIEF DESCRIPTION OF THE DRAWING

A complete understanding of the present invention and of the above and other objects and advantages thereof may be gained from a consideration of the following detailed description of a specific illustrative embodiment presented in connection with the accompanying drawing which illustrates a throughput error detection system made in accordance with the principles of the present invention.

DETAILED DESCRIPTION

Error detection may consist simply of the appending of a single bit to each data character or word so as to give each word an even number of "1's" (or alternatively an even number of "0's"). Each word would then be considered as having an even parity. If an odd number of errors (transmitting a "1" to a "0" or vice versa) occurs, for example, in transmission of the word, the received word would be detected as having odd parity rather than the expected even parity, thus indicating that error(s) has occurred.

There are a variety of other arrangements in which more than one error checking bit is appended to each data word to either detect the presence of errors or in some instances both detect and correct errors. Various error detecting and correcting techniques are described in "error-correcting codes" by W. W. Peterson, the M.I.T. Press and John Wiley and Sons, 1961.

The system of the present invention utilizes parity checking in a unique manner to determine whether or not errors occur in the course of processing data by some type of logic unit. Referring to the drawing, which shows one illustrative embodiment of the system of the present invention, there is shown a logic unit 4 which is used in some data processing environment to process or operate upon data received over a data bus 8. The logic unit 4 might illustratively be an arithmetic logic unit, a microprocessor, or similar logic unit. The logic unit 4 processes received data and produces eight-bit output data words which are applied to a data bus 12.

Also included in the system of the present invention is a second or redundant logic unit 20 which operates in the same manner as the logic unit 4 and simultaneously therewith in response to clock signals from a clock circuit 24. That is, data received by logic unit 4 over the bus 8 is also received by the logic unit 20 which processes the data in the same fashion as does logic unit 4 and produces eight-bit output data words which are applied to a data bus 28.

The output data words which are produced by logic unit 20 are supplied to a parity bit generator 32 which produces a parity bit for each data word (either of even parity or odd parity) and this parity bit is supplied to a nine-bit data bus 16. The output data words which are produced by the logic unit 4 are supplied to a delay circuit 14 which delays the words for a time corresponding to the time it takes for the parity bit generator 32 to generate a parity bit. The data words are then supplied to the data bus 16. The information thus supplied to the data bus 16 includes the data words produced by the logic unit 4 and the parity bits produced for the corresponding output data words produced by the logic unit 20. If the output data words produced by logic unit 4 and logic unit 20 are the same, then the parity bits supplied by the parity bit generator 32 should be correct for the data words supplied by the logic unit 4. That is, if the outputs from the logic unit 4 and logic unit 20 are the same, then the parity bits supplied to the data bus 16 for the output data words supplied from logic unit 4 should indicate the absence of error. On the other hand, if parity is not correct, then an error must have occurred in the processing of data in either the logic unit 4 or the logic unit 20.

The data words and corresponding parity bits supplied to the data bus 16 are, in turn, supplied to other equipment of the system such as memory devices, registers, other processing units, etc. These data words and parity bits are also supplied to a parity check and decoding circuit 36 which decodes each data word and corresponding parity bit to determine whether or not parity is correct. If it is not, the parity circuit produces a signal which is supplied to an alarm circuit 40 which, in turn, produces some kind of alarm signal to notify the user of the system that an error has been detected. This signal could either be an audible signal such as produced by a bell or buzzer, or a visual signal such as the lighting of a lamp. The parity check and decoding circuit 36 could comprise a variety of well known logic arrangements including a simple parity bit generator for generating a parity bit for each data word received from the logic unit 4, and a comparator for comparing the generated parity with the received parity bit. If they do not match, then incorrect parity is indicated.

With a single bit parity as shown for the illustrated system, only an odd number of errors can be detected and so the parity check and decoding circuit 36 would signal the alarm circuit 40 if either 1, 3, etc., errors were present in the received data words. It is apparent, however, that systems could be provided in which multiple parity bits were utilized to enable the detection of more than an odd number of errors.

Once an error was detected, the user of the system could take whatever action he felt appropriate such as reprocessing the data in which the error occurred (assuming that such data could be recovered), marking the erroneous data so that it was known that the data contained an error, etc.

In the manner described, a simple arrangement is provided for determining whether or not errors occur in the processing of data by a logic unit. This is done by providing a redundant logic unit which is operated simultaneously with the primary logic unit. The output of the redundant logic unit is used to produce a parity bit which is supplied along with the output from the primary logic unit to a parity checking circuit which checks the parity to determine if an error has occurred.

It is to be understood that the above-described arrangement is only illustrative of the application of the principles of the present invention. Numerous modifications and alternative arrangements may be devised by those skilled in the art without departing from the spirit and scope of the present invention and the appended claims are intended to cover such modifications and arrangements.

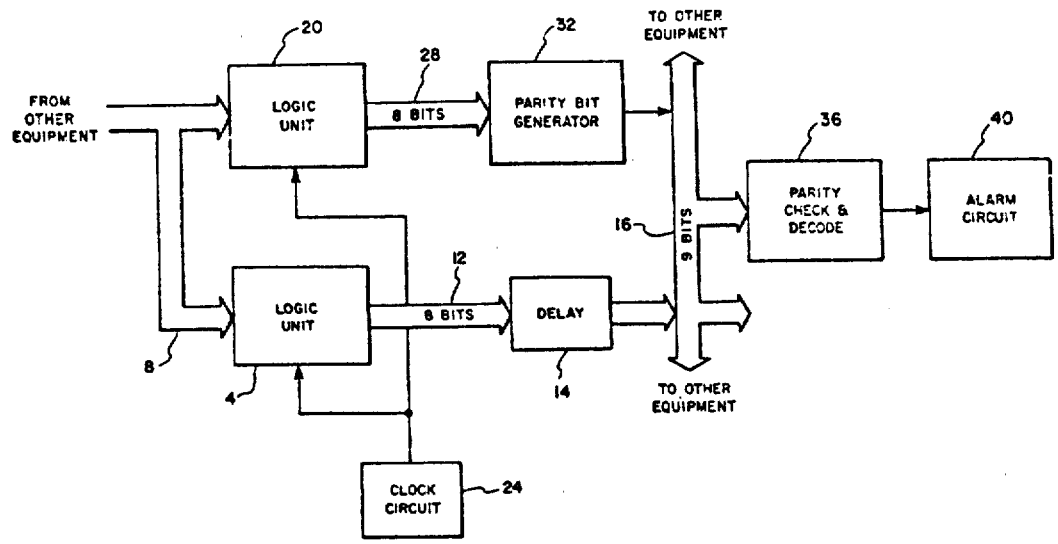

What is claimed is:

1. A throughput error checking system for checking errors which may occur in processing or operating upon data by a first logic unit, said first logic unit adapted to produce output data, said system including
a second logic unit for operating in the same manner as said first logic unit to produce output data,
means for generating parity check digits for the output data produced by said second logic unit,
means for decoding data and parity check digits to determine if parity is correct and for producing an error signal if it is not,
means for supplying output data from said first logic unit to said decoding means, and
means for supplying parity check digits from said parity check digit generating means to said decoding means.

2. A system as in claim 1 further including an alarm circuit responsive to said error signal for producing an alarm signal for notifying a user of the system.

3. A system as in claim 1 wherein said first and second logic units each produce n-bit output data words, wherein said parity check digit generating means generates a parity bit for each n-bit data word produced by said second logic unit, and wherein said two supplying means includes an n+1 bit data bus for supplying to said decoding means parity bits from said parity check digit generating means and output data words from said first logic unit.

4. A throughput error checking system for detecting errors which may occur in the processing of data by a first logic unit, said first logic unit being responsive to input data for producing an n-bit output data word, said system comprising
a second logic unit responsive to input data for operating in the same manner as said first logic unit to produce a corresponding n-bit output data word,
means for supplying input data simultaneously to said first and second logic units,
means for generating one or more parity check bits for the output data word produced by said second logic unit,
means for decoding n-bit data words and corresponding parity check bits to determine if parity is correct and for producing an error signal when it is determined that parity is incorrect,
means for supplying the n-bit data word produced by said first logic unit to said decoding means, and
means for supplying to said decoding means the parity check bits produced by said generating means for the n-bit data word produced by said second logic unit.

5. A system as in claim 4 further including an alarm means responsive to said error signal for producing an alarm indication for notifying a user of the system.

6. A system as in claim 4 wherein said parity check digit generating means produces a single parity bit for the n-bit data word produced by said second logic unit.

7. A system as in claim 6 wherein said supplying means includes an n+1 bit data bus coupled to said parity check digit generating means and to other equipment of the system.

8. A method of checking for errors in the processing of data by a first logic unit which produces output data words as a result of such processing, said method comprising
providing a second logic unit for processing the same data as the first logic unit in substantially the same manner, and for producing output data words corresponding to those produced by the first logic unit,
producing parity check digits for each data word produced by the second logic unit,
processing the parity check digits, and the output data words produced by the first logic unit which correspond to those output data words of the second logic unit for which the parity check digits are produced, to determine if parity is correct, and
producing a signal if it is determined that parity is incorrect.

* * * * *

UNITED STATES PATENT AND TRADEMARK OFFICE
CERTIFICATE OF CORRECTION

PATENT NO. : 4,326,291

DATED : April 20, 1982

INVENTOR(S) : Phillip W. Marsh

It is certified that error appears in the above—identified patent and that said Letters Patent is hereby corrected as shown below:

The Title Page should appear as shown on the attached sheet.

Signed and Sealed this

Twentieth Day of July 1982

[SEAL]

Attest:

Attesting Officer

GERALD J. MOSSINGHOFF

Commissioner of Patents and Trademarks

United States Patent [19]

Marsh et al.

[11] 4,326,291
[45] Apr. 20, 1982

[54] ERROR DETECTION SYSTEM

[75] Inventors: Phillip W. Marsh, Granger; Gregory B. Wiedenman, Sandy, both of Utah

[73] Assignee: Sperry Rand Corporation, New York, N.Y.

[21] Appl. No.: 29,074

[22] Filed: Apr. 11, 1979

[51] Int. Cl.³ .................. G06F 11/10; G06F 11/16
[52] U.S. Cl. .................................. 371/68; 364/741; 371/49
[58] Field of Search .......... 340/146.1 AG, 146.1 BA, 340/146.1 BE; 235/306, 307; 364/741; 371/49, 68

[56] References Cited

U.S. PATENT DOCUMENTS

| | | | |
|---|---|---|---|
| 3,303,482 | 2/1967 | Jenkins | 340/146.1 AG X |
| 3,476,922 | 11/1969 | Yiotis | 235/307 |
| 3,531,631 | 9/1970 | Burgess | 340/146.1 AG X |
| 3,599,146 | 8/1971 | Weisbecker | 340/146.1 AG |

Primary Examiner—Jerry Smith
Attorney, Agent, or Firm—Thorpe, North, Western & Gold

[57] ABSTRACT

In a throughput error detection system, a redundant logic unit is provided along with a required logic unit for simultaneous operation therewith. The required logic unit and redundant logic unit both produce output data which, it is desired, will be the same. The output data from the required logic unit is supplied to a data bus and the output data of the redundant logic unit is supplied to a parity check digit generator. From the data received from the redundant logic unit, the parity check digit generator generates a parity check digit which is applied to the data bus along wih the data from the required logic unit. A parity checking circuit receives the data and the parity check digit from the data bus and a calculation is made by the circuit to determine if parity is correct. If parity is not correct, the checking circuit produces an alarm signal to alert a user.

8 Claims, 1 Drawing Figure